United States Patent [19]
Kimura

[11] Patent Number: 5,935,303
[45] Date of Patent: Aug. 10, 1999

[54] ELECTROSTATIC FILTER

[75] Inventor: Kazushi Kimura, Tokyo, Japan

[73] Assignee: Koken Ltd., Tokyo, Japan

[21] Appl. No.: 08/892,535

[22] Filed: Jul. 14, 1997

[30] Foreign Application Priority Data

Dec. 26, 1996 [JP] Japan .................................. 8-357255

[51] Int. Cl.$^6$ .............................. B03C 3/155; B03C 3/64
[52] U.S. Cl. .................................. 96/69; 55/524; 55/528; 55/DIG. 5; 55/DIG. 39; 264/441; 264/484; 264/DIG. 8; 264/DIG. 48; 442/110; 442/414
[58] Field of Search ...................... 96/15, 98, 65, 96/66, 69; 442/110, 414; 95/57; 307/400; 55/528, 524, DIG. 5, DIG. 39; 264/484, 441, DIG. 48, DIG. 8

[56] References Cited

U.S. PATENT DOCUMENTS

| | | | |
|---|---|---|---|
| 5,112,677 | 5/1992 | Tani et al. | 55/DIG. 39 |
| 5,409,766 | 4/1995 | Yuasa et al. | 55/DIG. 39 |
| 5,411,576 | 5/1995 | Jones et al. | 95/57 |
| 5,419,953 | 5/1995 | Chapman | 96/15 X |
| 5,597,645 | 1/1997 | Pike et al. | 55/DIG. 39 |
| 5,599,366 | 2/1997 | Hassenboehler, Jr. et al. | 55/DIG. 39 |
| 5,610,455 | 3/1997 | Allen et al. | 55/DIG. 39 |
| 5,645,057 | 7/1997 | Watt et al. | 55/DIG. 39 |
| 5,645,627 | 7/1997 | Lifshutz et al. | 96/15 |
| 5,709,735 | 1/1998 | Midkiff et al. | 55/DIG. 39 |
| 5,726,107 | 3/1998 | Dahringer et al. | 55/DIG. 39 |
| 5,830,810 | 11/1998 | Cohen | 55/DIG. 39 |

FOREIGN PATENT DOCUMENTS

| | | | |
|---|---|---|---|
| 488822 | 6/1992 | European Pat. Off. | 96/98 |
| 2431197 | 2/1975 | Germany . | |
| 56-21619 | 2/1981 | Japan | 55/DIG. 39 |
| 59-32166 | 7/1984 | Japan . | |
| 60-044015 | 3/1985 | Japan . | |
| 61-071814 | 4/1986 | Japan . | |
| 3-31483 | 7/1991 | Japan . | |
| 2060259 | 4/1981 | United Kingdom | 55/DIG. 39 |
| 94/18242 | 8/1994 | WIPO . | |

*Primary Examiner*—Richard L. Chiesa
*Attorney, Agent, or Firm*—Lowe Hauptman Gopstein Gilman & Berner

[57] ABSTRACT

An electrostatic filter includes a fibrous component including a mixture of wool and synthetic fibers and a resinous component including a perfluoroalkyl acrylate copolymer resin and a p-tert-butylphenol formaldehyde resin, which resinous component is adhering to the fibrous component, both of the fibrous substrate component and the resinous component being in electrostatically charged conditions.

10 Claims, 14 Drawing Sheets

FIG.1  Test result of the PFA/STA filter, No.1

FIG.2 Test result of the PFA/STA filter, No.2

FIG.3 Test result of the PFA/STA filter, No.3

FIG.4  Test result of the PFA/STA filter, No.4

FIG.5  Test result of the MK filter

FIG.6 Test result of the PFA/STA filter

FIG.7 Test result of the PMMA filter

FIG.8  Test result of the PSt filter

ELECTROSTATIC FILTER

BACKGROUND OF THE INVENTION

The present invention relates to an electrostatic filter suitable for a respirator or the like.

So-called resin wool is a well known filter media, which comprises a fibrous sheet-like component composed of felt or nonwoven fabric made of an animal wool fiber and a resinous component composed of a synthetic resin such as phenolic resin, with which the fibrous component is impregnated or which is coated to the fibrous component. The resin wool media undergoes a friction treatment to generate electrostatic charges thereon. The charged resin wool media has conventionally been used as a high performance electrostatic filter for a respirator such as a dust respirator in view of the fact that the filter provides a high collecting efficiency for fine dust without significantly increasing resistance against breathed air.

Figure 12:
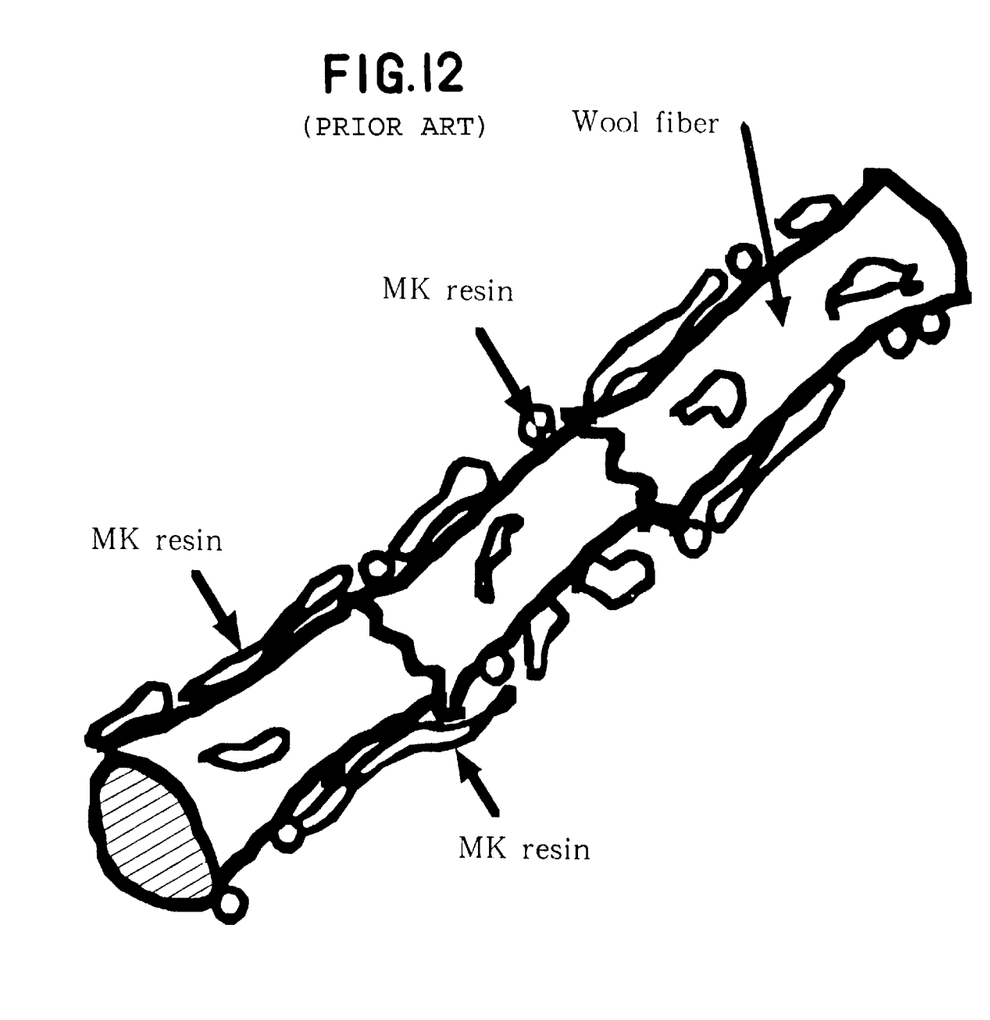
FIG. 12 is a schematic diagram illustrating an electrostatic filter of the prior art.

Such a well known electrostatic resin wool filter of prior art comprising animal wool felt impregnated with phenolic resin (hereinafter referred to MK resin) is schematically illustrated by FIG. 12 of the accompanying drawings. This filter is based on such a principle that an animal wool fiber develops a positive charge and a phenolic resin develops a compensating negative charge and the filter as a whole is left in an electrostatically neutral condition. Particles such as dust particles are usually positively or negatively charged and attracted and collected by the oppositely charged fiber and resin of the electrostatic filter as these particles pass through the filter. Examples of the electrostatic filter based on such a principle are disclosed by Japanese Patent Publication No. S59-32166 (Patent Registration No. 1256142) entitled "Electrostatic Air Filter" and Japanese Patent Publication No. H03-31483 (Patent Registration No. 1676882) entitled "Electrostatic Air Filter", both of which disclosures are incorporated herein by reference. According to Japanese Patent Publication No. H03-31483 an electrostatic filter comprises a fibrous component made of wool and synthetic polyester (PET) fibers, and a resinous component constituted by a phenolic resin distributed over the fibrous component.

While well known electrostatic filters as have been described above certainly have a good collecting efficiency for solid particles, it has recently been reported by several articles (e.g. Mark W. Ackley: "Degradation of Electrostatic Filters at Elevated Temperature and Humidity", Filtration & Separation, July/August, 1985, 239–242) that these electrostatic filters exhibit a degradation of an efficiency in aerosol collection.

The NIOSH Standard of the U.S. for respiratory devices revised in October, 1995 (42 CFR Part 84 Respiratory Protective Devices, in which a dust respirator is included) requires an efficiency test using aerosol such as oil mist. According to the Standard, the test should be conducted with a particle concentration of DOP aerosol not exceeding 200 mg/m$^3$, an average particle dia. of DOP being approximately 0.2 $\mu$m (0.17–0.22, a geometric standard deviation of $\sigma g<1.6$) and an aerosol flow rate of 85±2 liter/min. The Standard requires that a mask should maintain its collecting efficiency of 95% or higher even after DOP has been continuously supplied by 200±5 mg and the mask to be tested should be preconditioned at a temperature of 38±2.5° C. and a relative humidity of 85±5% for 25±1 hours.

The testing conditions of the NIOSH Standard significantly differ from the testing conditions imposed by the current Japanese National Standard for certifying dust respirators and the Japanese Industrial Standard for testing dust respirators (in both of the Standards quartz particle dust having a particle dia. not exceeding 2 $\mu$m is supplied through a mask at a flow rate of 30 liter/min and an increase in the inspiratory resistance is determined as of a moment at which an accumulation of the dust reaches 100 mg.). Probably no respiratory masks equipped with electrostatic filters are commercially available in Japan which meet the requirements of the revised NIOSH Standard. According to the NIOSH test conducted by the applicant of the present invention, the above-mentioned electrostatic filters of the prior art showed that the filters could not meet the reference value required by the NIOSH Standard, as will be described later in reference with FIG. 5.

Generally, in an electrostatically charged substance, static charges are progressively neutralized or discharged if the substance is left as it is for a long time in an environment at elevated temperature and humidity. It is well known that such a progressive decrease of the charges in an electrostatic filter results in degradation in a dust collecting efficiency of the filter. In addition, DOP aerosol particles used in the NIOSH efficiency test are oily liquid of a relatively low viscosity and tend to wet and cover charged surfaces of the fiber as well as of the resin of the filter with oil as the DOP particles accumulate on the filter. The collecting efficiency of the filter is further degraded at an accelerated speed probably because the DOP aerosol accumulated on the surfaces begins to progress through the filter. In order to obtain a respirator filter which meets the NIOSH Standard, therefore, it is essential to provide an electrostatic filter of the prior art with effective countermeasures against the above-mentioned degradation caused by the preconditioning at the elevated temperature and humidity and the DOP aerosol applied by the NIOSH test.

While a phenolic resin used in an electrostatic filter of the prior art is satisfactory so far as its electrostatic characteristic is concerned, a serious problem is caused by its affinity to oily substances such as DOP. More specifically, DOP aerosol develops over the surface of the filter and then penetrate the electrostatically charged resin, with a result that the charges which have been held within the resin may be neutralized or discharged and thereby the collecting efficiency of the filter may be degraded. Accordingly, it can be expected to minimize such a degradation of the collecting efficiency, if it is possible to improve a behavior of the resin against the DOP aerosol without deterioration of its electrostatic feature.

SUMMARY OF THE INVENTION

In view of the situation as has been described above, it is a principal object of the invention to provide an electrostatic filter to withstand effects caused by DOP aerosol and to meet the NIOSH Standard.

The object set forth above is achieved, according to the invention, by an electrostatic filter comprising an elecrostatically charged fibrous component including a mixture of an animal wool fiber and a thermoplastic synthetic fiber, and an electrostatically charged resinous component adhering to the fibrous component and including a p-tert-butylphenol formaldehyde resin, wherein the resinous component includes further at least an electrostatically charged perfluoroalkyl acrylate copolymer resin.

According to an embodiment of the invention, the resinous component includes further at least any one of a polyalkyl acrylate resin, a polyalkyl methacrylate resin, and a polyalkyl styrene resin, each of which resins is in an electrostatically charged condition. Preferably, a polymethyl methacarylate resin is used as the polyalkyl methacrylate resin and a polystyrene resin is used as the polyalkyl styrene resin. More preferably, the resinous component includes a polymethyl methacarylate resin and a polystyrene resin, both of which resins are in electrostatically charged conditions.

According to another embodiment of the invention, the fibrous component has been impregnated with the resinous component which has been solidified thereafter.

According to still another embodiment of the invention, the fibrous component includes the wool fiber having a diameter of 15 to 33 μm and the thermoplastic synthetic fiber having a fineness not exceeding 1.5 denier(d).

The fibrous component preferably comprises a wool fiber of 20–70% by weight and a polyester fiber of 80–30% by weight. The fibrous component may have a weight range of 200–800 g/m$^2$, and may be any one of a nonwoven fabric and a felt.

DESCRIPTION OF THE PREFERRED EMBODIMENTS

The present invention makes it possible to modify a conventional electrostatic filter impregnated with electrically chargeable resins such as a p-tert-butylphenol formaldehyde resin (referred to hereinafter also as MK resin), a polystyrene resin (PSt resin) or a polymethyl methacrylate resin (PMMA resin).

As a fibrous component of the electrostatic filter according to the invention, a felt or a nonwoven fabric comprising a mixture of an animal wool fiber and a thermoplastic synthetic fiber is used. The thermoplastic synthetic fiber is preferably of a fineness which does not exceed 1.5 d, and various types of thermoplastic synthetic fibers and a mixture thereof such as a polyester fiber, an acrylic fiber, a polypropylene fiber and a nylon fiber may be used. Mixing ratio in weight of the wool fiber and the thermoplastic synthetic fiber is 1:9–9:1 and more preferably 1:9–8:2. When the polyester fiber is used as the thermoplastic synthetic fiber, the mixing ratio is preferably selected from a range 2:8–7:3. The fibrous component may have a weight range of 200–800 g/m$^2$.

The wool and thermoplastic synthetic fibers may be used in a form of air-laid single-layered web obtained by mixing and accumulating these fibers using a cotton opener or an air stream, or directly in a form of single-layered web obtained by treating such a mixture of fibers with a carding machine or in a form of nonwoven fabric formed by adding the web with a suitable binder. Additionally, the mixture of the wool and thermoplastic synthetic fibers may be used also in a form of nonwoven fabric obtained by laminating a plurality of single-layered webs, or in a form of nonwoven fabric obtained by subjecting a single-layered web or a lamination thereof to high pressure water jet so as to intertwine individual fibers of the web or in a form of nonwoven fabric obtained by heating a single-layered web or lamination thereof optionally under a pressure so as to melt and bond the individual synthetic fibers to each other.

The synthetic fiber may be a mixture of two or more different types or may be of the same type but of different finenesses. It is also possible to use a non-crimped or crimped composite fiber comprising two kinds of synthetic resins different in melting temperatures. Furthermore, it is also possible to use a superfine fiber or a nonwoven fabric composed of such a superfine fiber of a fineness not exceeding 1 d such as a melt-blown fiber or a flush spun fiber, for example, of polypropylene, polyester or polybutylene terephthalate.

The fibrous component as has been described above is then impregnated with a liquid resin obtained by dissolving a perfluoroalkyl acrylate copolymer resin (referred to hereinafter also as PFA copolymer resin) and the MK resin in a nonflammable organic solvent such as Trichlene (trichloroethylene) and then the impregnated liquid resin is solidified, for example, using the method disclosed by the previously mentioned Japanese Patent Publication No. H03-31483. The fibrous component thus having the resinous component solidified thereon is now subjected to a mechanical treatment to be rendered highly charged. In this manner, the electrostatic filter of the invention is obtained.

The PFA copolymer resin is a random copolymer having a general formula (I). In the formula I, m is an integral number having a value of 8 or more, and n is an integral number having a value of 18 or more, and $R_1$ and $R_2$ are selected from the group consisting of a hydrogen atom and an alkyl-group, and a mol ratio of a:b equals to 2:1–1:2, preferably, 1:1. An example of the PFA copolymer resin is a random copolymer which is obtained by copolymerization of perfluorooctylethyl acrylate [n-$C_8F_{17}(CH_2)_2$COOCH=$CH_2$] as perfluoroalkyl acrylate and stearyl acrylate (referred to also octadecyl acrylate) [n-$C_{18}H_{37}$COOCH=$CH_2$] at a mol ratio of 1:1, and has a molecular weight of approximately 3,000–50,000 (determined by GPC analysis based on polystyrene). This random copolymer is referred to hereinafter also as a PFA/STA resin. The PFA/STA resin is sufficiently compatible with p-tert-butylphenol formaldehyde (i.e. MK resin), owing to the existance of the copolymerized stearyl acrylate. In addition, a perfluoroalkyl-group [$CF_3(CF_2)_n$—] has a stereostructure which is easily oriented on the PFA/STA resin surface and a significant oil repellency. The presence of such a copolymer could be thought to serve to protect the interior of the filter against free electrons outside the filter as well as against substances coming in contact with the filter and thereby to prevent a quantity of electrostatic charges stored in the interior of the filter from being rapidly attenuated.

In the inventive electrostatic filter both of the MK resin and the PFA copolymer resin are negatively charged. Specifically the PFA copolymer resin tends to be highly charged because of an electronegative nature peculiar to the fluorine atom and, even when it is mixed with the MK resin, there occurs neither electrical neutralization nor interaction between these two resins. Moreover, the PFA copolymer resin has a significant oil repellent nature and, when it is mixed with the MK resin, prevents oil particles from penetrating the MK resin. In this way, the invention provides a filter with charges which can not be easily discharged nor destroyed in comparison with conventional electrostatic filters and a filter which has a high collecting efficiency and a low resistance which are indispensable natures to a respirator.

[Formula I]

(i) m is an integral number having a value of eight (8) or more.

(ii) n is an integral number having a value of eighteen (18) or more.

(iii) $R_1$ and $R_2$ are selected from the group consisting of a hydrogen atom and an alkyl-group.

A filter media is well known which comprises a sheet-like fibrous component and a water and oil repellent coated thereon. The media of this well known type is characterized by that the fiber surfaces of the component are coated with a fluorocarbon compound which is a repellent. The media of this type cannot meet the revised NIOSH Standard.

Details of the invention will be further fully understood from the description given hereunder in reference with the embodiments of the invention and the comparative examples.

[Embodiment 1]

A nonwoven fabric comprising a mixture of an animal wool fiber (having an average fiber diameter of 20 μm) of 40% by weight and a polyester fiber (having a fineness of 0.75 d) of 60% by weight was used as a fibrous component of a filter. This component had a dry weight of approximately 450 g/m² and a thickness of approximately 3 mm.

Perfluoroethyl acrylate (i.e. ethyl acrylate monomer having a [n-$C_8F_{17}(CF_2)_2$-]group) and stearyl acrylate (acrylate monomer having a $C_{18}H_{37}$-group, i.e. a stearyl group) were copolymerized at a mol ratio of 1:1 according to a conventional polymerization process to obtain a perfluoroalkyl acrylate resin (a PFA/STA resin) having an average molecular weight Mn of approximately 3,000–4,000 (determined by GPC analysis based on polystyrene). In 1 liter of Trichlene 24.8 g of the PFA/STA resin and 16.5 g of p-tert-butylphenol formaldehyde resin (i.e. the MK resin having an average molecular weight Mn of approximately 3,500–4,500, which was determined by GPC analysis based on polystyrene) which is a well known polymer for an electrostatic fiber were dissolved to obtain a processing liquid A.

After the fibrous component was impregnated with the processing liquid A at a ratio of 3.3 liter/m², the component was dried by a hot air dryer at a temperature of 120° C. for approximately 1 hour and thereby the mixture of the PFA/STA and MK resins was adhesively solidified as a resinous component thereon. The fibrous and resinous components were then subjected to a mechanical friction treatment taught by Japanese Patent Publication No. H03-31483 to charge the components and thereby an electrostatic filter (PFA/STA filter, No. 1) was obtained.

Figure 1:
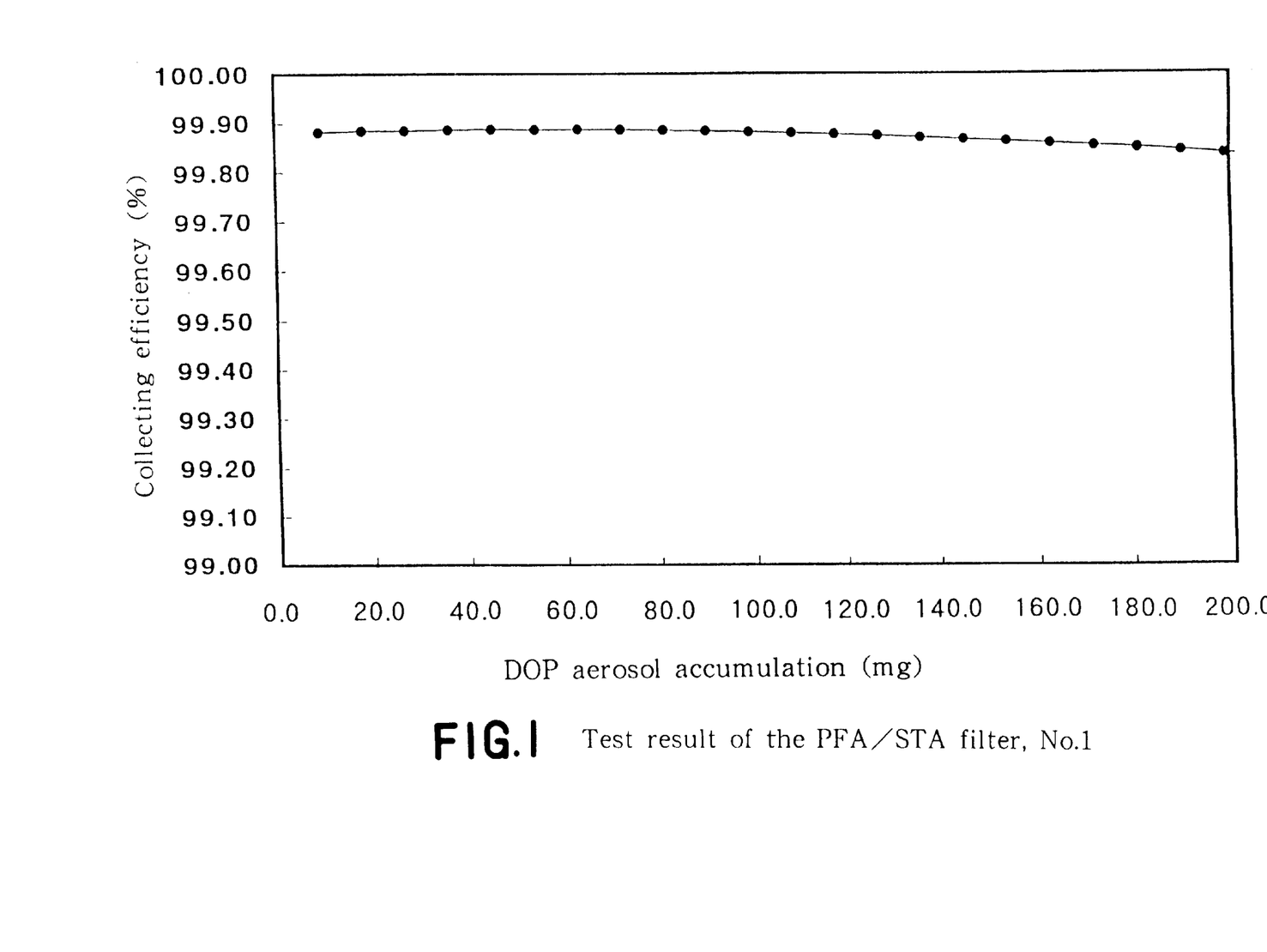
FIG. 1 graphically shows a test result obtained with respect to the PFA/STA filter, No. 1 of the first embodiment of the invention.

On this electrostatic filter, the DOP aerosol collecting efficiency test prescribed by the revised NIOSH Standard was conducted and a result shown by FIG. 1 was obtained. The test conditions were as follows: DOP aerosol concentration of 100 mg/m³; filter area of 100 cm²; and flow rate through the test filter of 85 liter/min. As a preconditioning, the test filter was left at a temperature of 40° C. and a relative humidity of 85% for 25 hours. FIG. 1 shows a collecting efficiency in % of the test filter versus DOP aerosol accumulation, so called DOP loading in mg.

Figure 5:
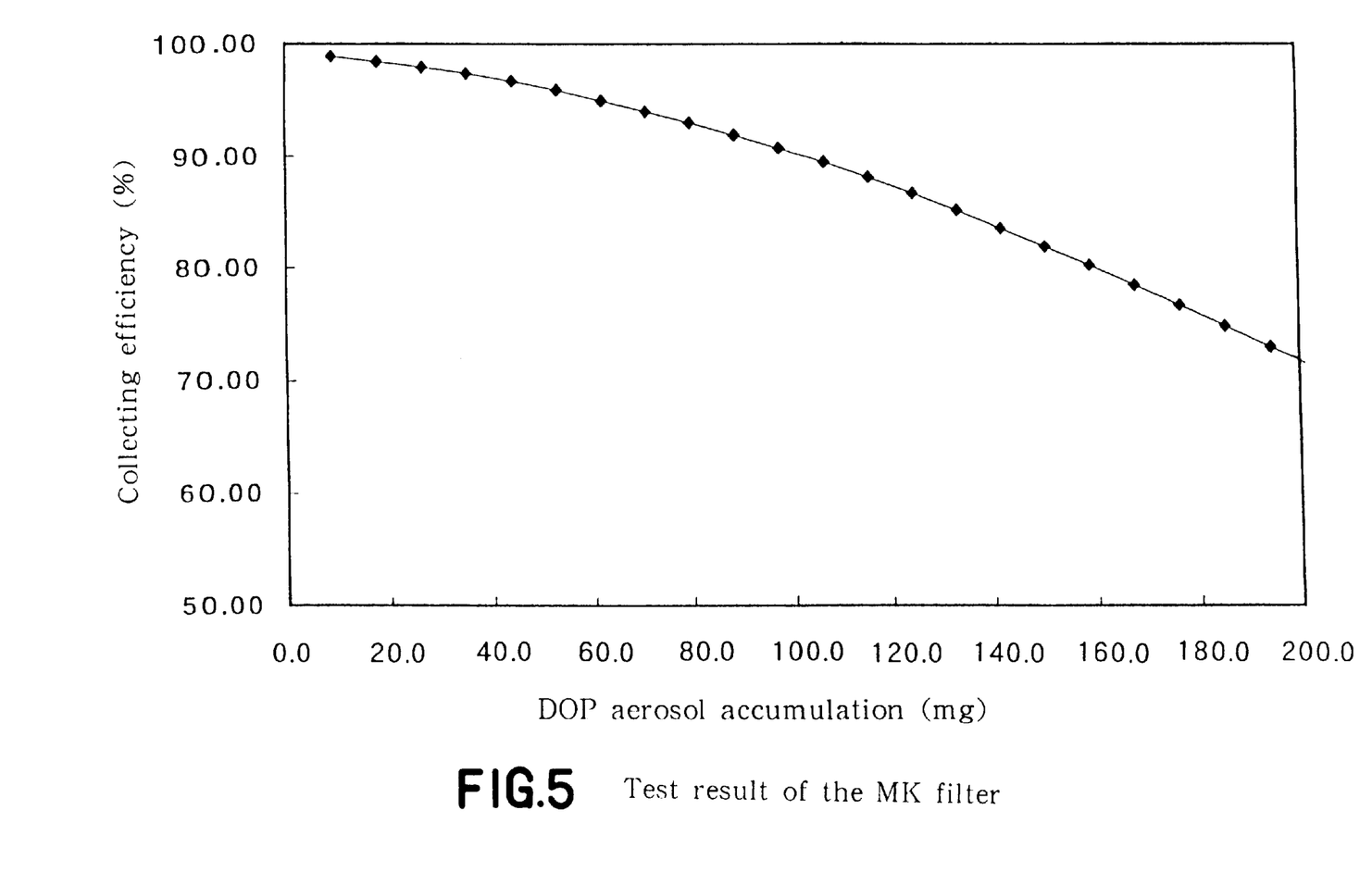
FIG. 5 graphically shows a test result obtained with respect to the MK filter of the first comparative example.

As will be apparent from FIG. 1, the electrostatic filter of the invention maintains a high collecting efficiency even after 200 mg of DOP aerosol has accumulated thereon and this efficiency cannot be achieved by the MK filter of the prior art (See FIG. 5).

[Embodiment 2]

Figure 2:
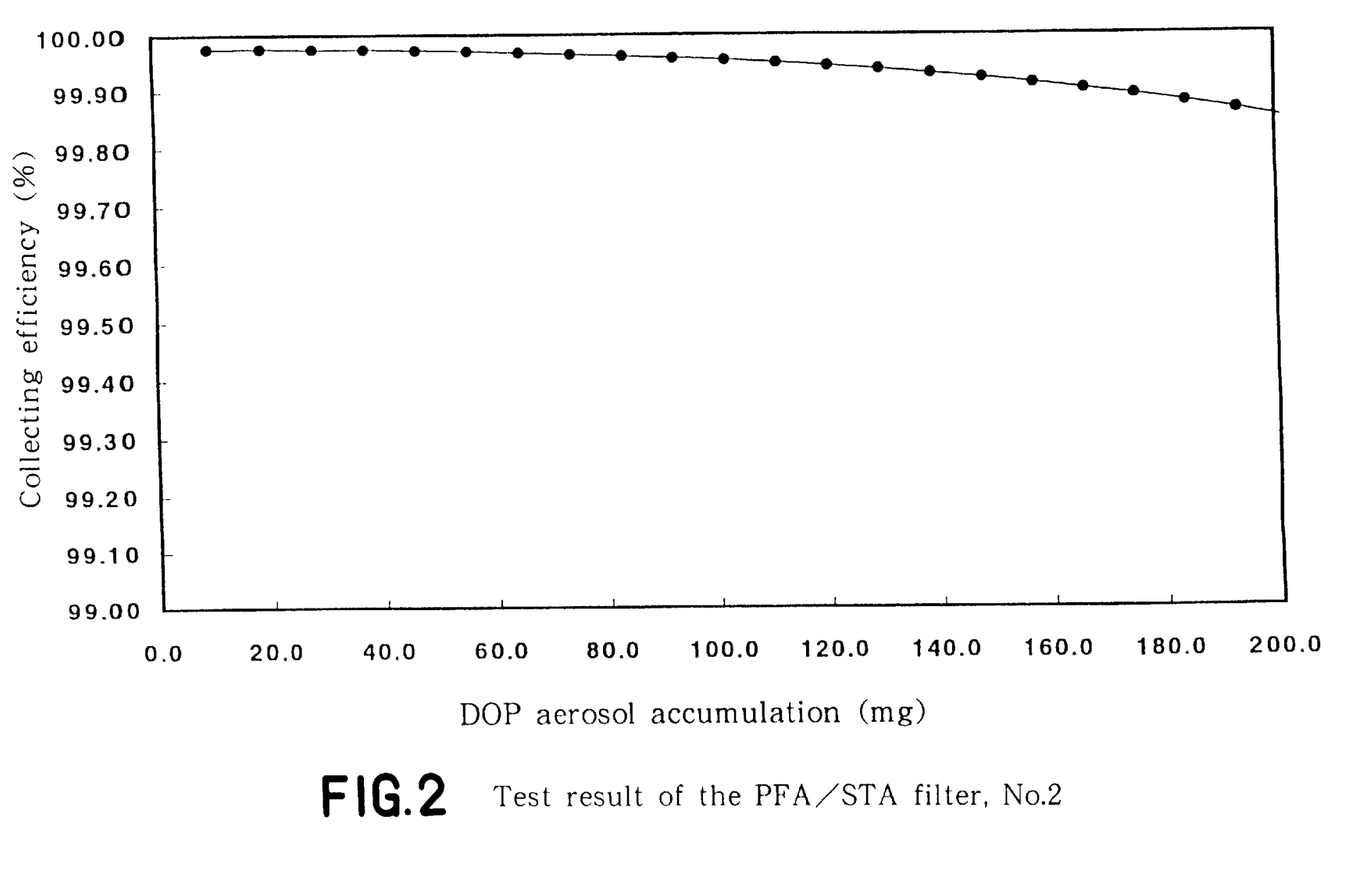
FIG. 2 graphically shows a test result obtained with respect to the PFA/STA filter, No. 2 of the second embodiment of the invention.

In addition to 24.8 g of the PFA/STA resin and 16.5 g of the MK resin both as used as a resinous component in Embodiment 1, 3.3 g of a PMMA resin (having a molecular weight of approximately 350,000) was also dissolved in 1 liter of Trichlene to obtain a processing liquid B. The fibrous component was treated in the same manner as in Embodiment 1 with this processing liquid B instead of the processing liquid A to obtain an electrostatic filter (PFA/STA filter, No. 2). On this filter, the DOP aerosol collecting efficiency test prescribed by the revised NIOSH Standard was conducted under the same conditions as in Embodiment 1 and a result as shown by FIG. 2 was obtained.

[Embodiment 3]

Figure 3:
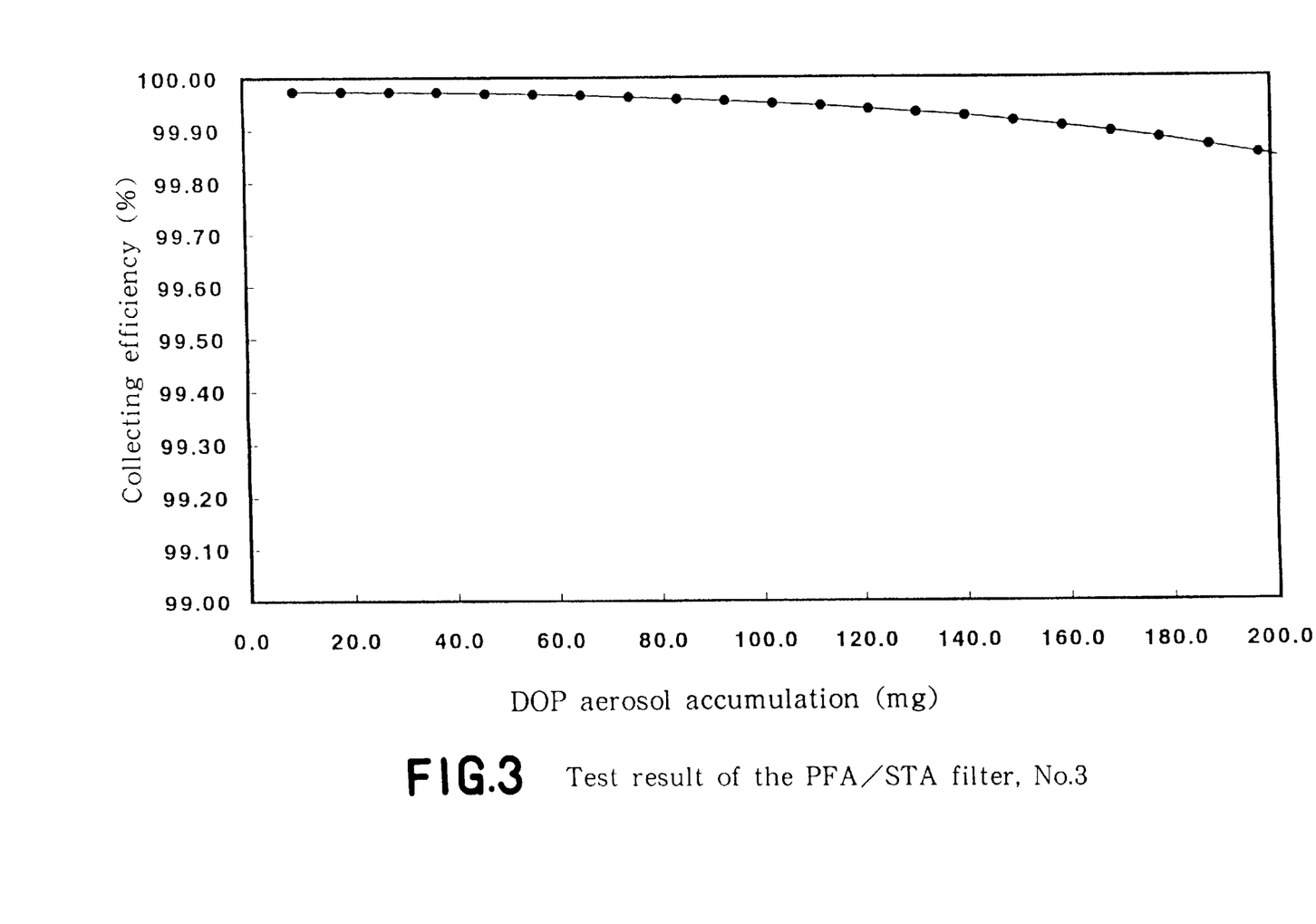
FIG. 3 graphically shows a test result obtained with respect to the PFA/STA filter, No. 3 of the third embodiment of the invention.

In addition to 24.8 g of the PFA/STA resin and 16.5 g of the MK resin both as used as a resinous component in Embodiment 1, 8 g of the PSt resin (having a molecular weight of approximately 250,000) was also dissolved in 1 liter of Trichlene to obtain a processing liquid C. The fibrous component was treated in the same manner as in Embodiment 1 with the processing liquid C instead of the processing liquid A to obtain an electrostatic filter (PFA/STA filter, No. 3). On this filter, the DOP aerosol collecting efficiency test prescribed by the revised NIOSH Standard was conducted under the same conditions as in Embodiment 1 and a result as shown by FIG. 3 was obtained.

[Embodiment 4]

Figure 4:
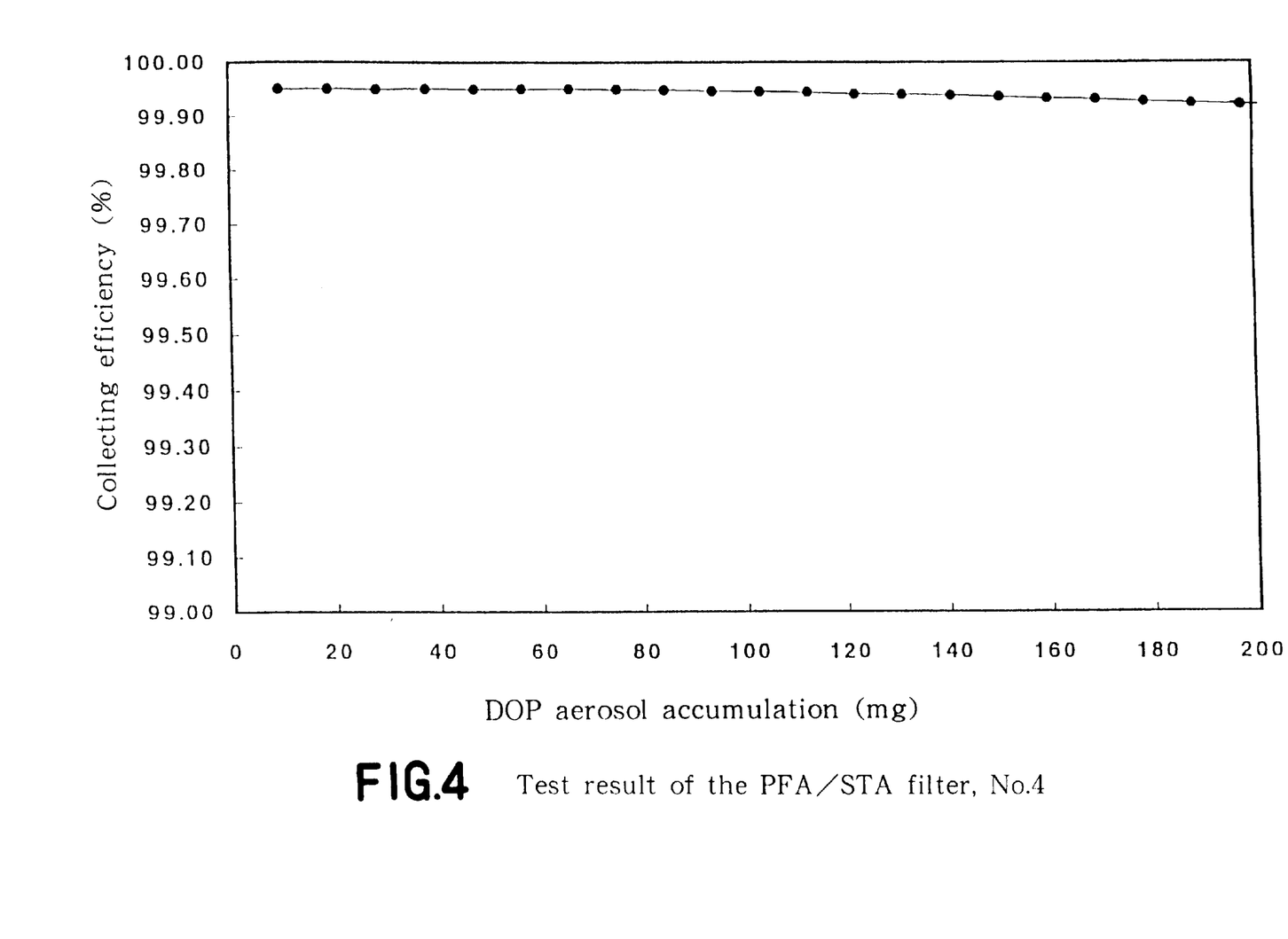
FIG. 4 graphically shows a test result obtained with respect to the PFA/STA filter, No. 4 of the fourth embodiment of the invention.

In addition to 24.8 g of the PFA/STA resin and 16.5 g of the MK resin both as used as a resinous component in Embodiment 1, 3.3 g of the PMMA resin as used in Embodiment 2 and 8 g of the PSt resin as used in Embodiment 3 were also dissolved in 1 liter of Trichlene to obtain a processing liquid D. The fibrous component was treated in the same manner as in Embodiment 1 with this processing liquid D instead of the processing liquid A to obtain an electrostatic filter (PFA/STA filter, No. 4). On this filter, the DOP aerosol collecting efficiency test prescribed by the revised NIOSH Standard was conducted under the same conditions as in Embodiment 1 and a result as shown by FIG. 4 was obtained.

[Embodiment 5]

The DOP aerosol collecting efficiency test was conducted on a plurality of electrostatic filters (corresponding to the PFA/STA filter, No. 4) obtained by impregnating a plurality of fibrous components made of the wool and polyester fibers mixed with each other at different weight ratios with the processing liquid D as used in Embodiment 4, and test results as shown by Table 1 were obtained.

Table 1 suggests that the mixing ratio of the wool fiber (having a fiber diameter of 20 μm) and the polyester fiber (PET)(having a fineness of 0.75 d) influences upon the DOP collecting efficiency. However, it should be understood here that the respective filters were not subjected to a preconditioning in this Embodiment.

TABLE 1

Mixing ratio of wool and polyester fibers vs. DOP collecting efficiency

| Mixing ratio (wt %) | | |
|---|---|---|
| Wool fiber | Polyester fiber | DOP collecting efficiency (%) |
| 100 | 0 | 85.620 |
| 90 | 10 | 98.300 |
| 80 | 20 | 99.725 |
| 70 | 30 | 99.850 |
| 60 | 40 | 99.952 |
| 50 | 50 | 99.976 |
| 40 | 60 | 99.990 |
| 30 | 70 | 99.980 |
| 20 | 80 | 99.960 |
| 10 | 90 | 99.900 |
| 0 | 100 | 98.000 |

[Comparative Example 1]

16.5 g of the MK resin as used in Embodiment 1 was dissolved in 1 liter of Trichlene to obtain a processing liquid E. The fibrous component was treated in the same manner as in Embodiment 1 with this processing liquid E instead of the processing liquid A to obtain an electrostatic filter (MK filter). On this MK filter, the DOP aerosol collecting efficiency test prescribed by the revised NIOSH Standard was conducted under the same conditions as in Embodiment 1 and a result as shown by FIG. 5 was obtained. This MK filter is a typical electrostatic filter of the prior art.

[Comparative Example 2]

Figure 6:
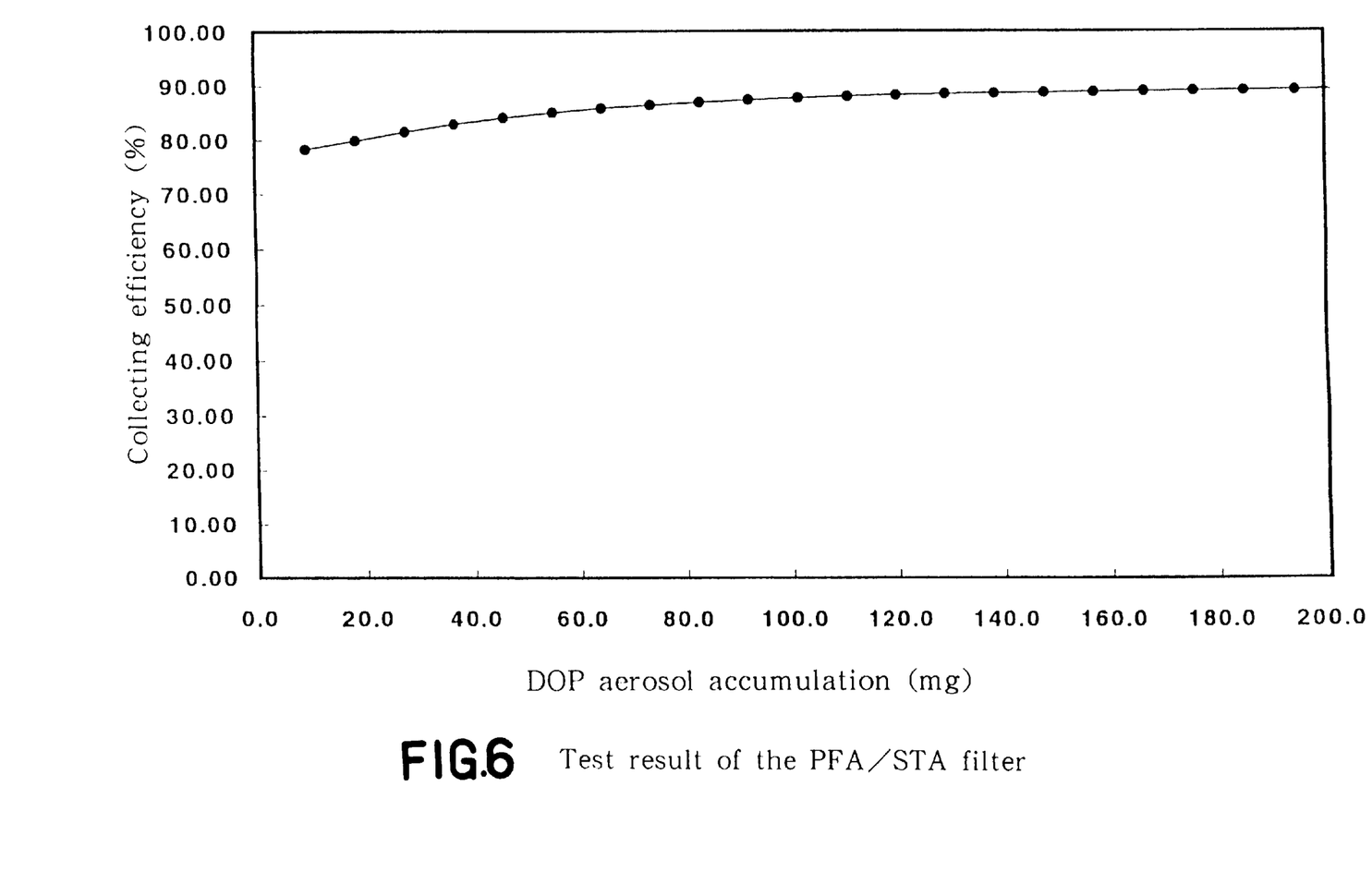
FIG. 6 graphically shows a test result obtained with respect to the PFA/STA filter of the second comparative example.

24.8 g of the PFA/STA resin as used in Embodiment 1 is dissolved in 1 liter of Trichlene to obtain a processing liquid F. The fibrous component was treated in the same manner as in Embodiment 1 with this processing liquid F instead of the processing liquid A to obtain an electrostatic filter (PFA/STA filter). On this PFA/STA filter, the same test as in Embodiment 1 was conducted and a result as shown by FIG. 6 was obtained.

[Comparative Example 3]

Figure 7:
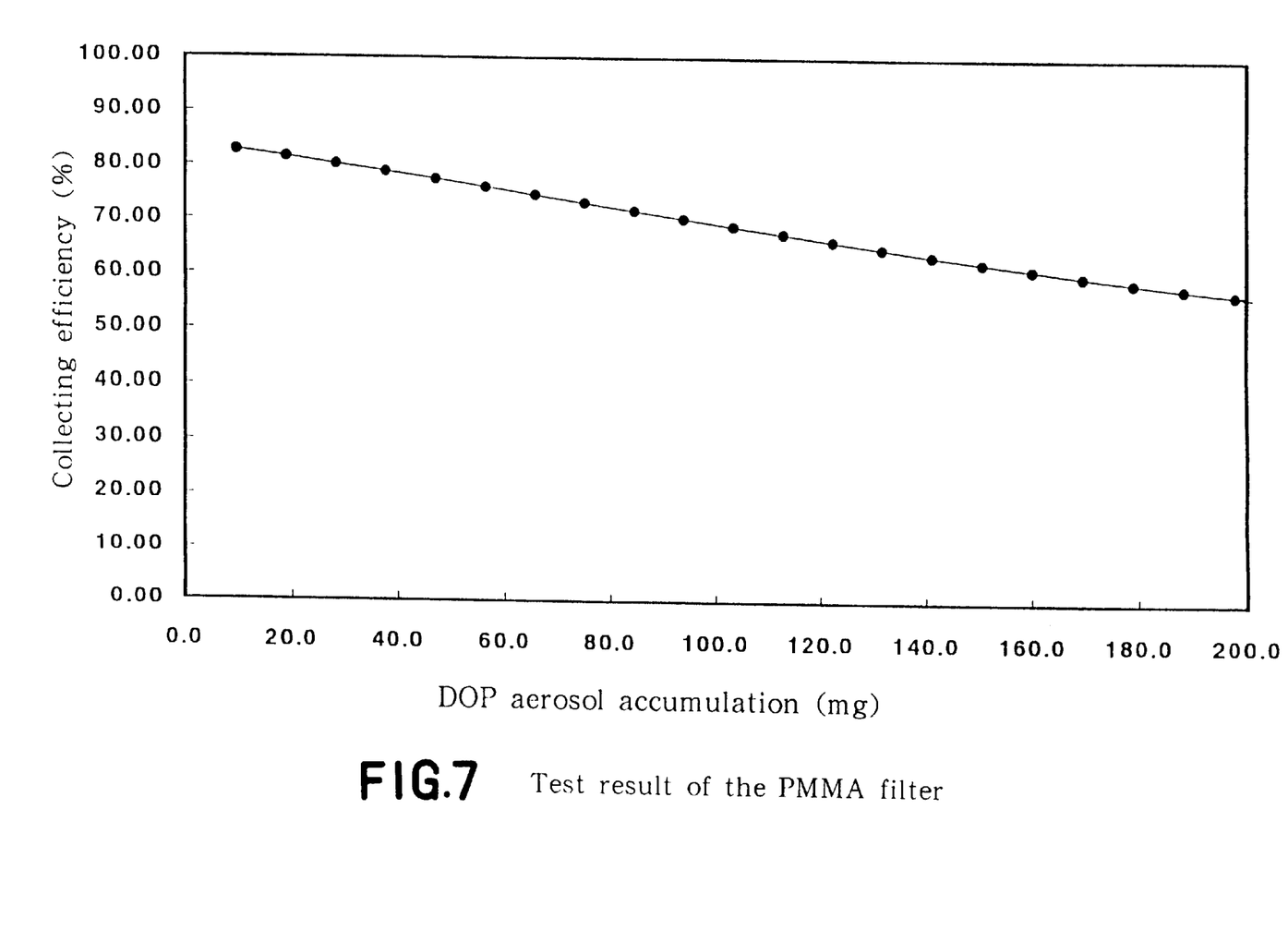
FIG. 7 graphically shows a test result obtained with respect to the PMMA filter of the third comparative example.

3.3 g of the PMMA resin as used in Embodiment 2 was dissolved in 1 liter of Trichlene to obtain a processing liquid G. The fibrous component was treated in the same manner as in Embodiment 1 with this processing liquid G instead of the processing liquid A to obtain an electrostatic filter (PMMA filter). On this PMMA filter, the same test as in Embodiment 1 was conducted and a result as shown by FIG. 7 was obtained.

[Comparative Example 4]

Figure 8:
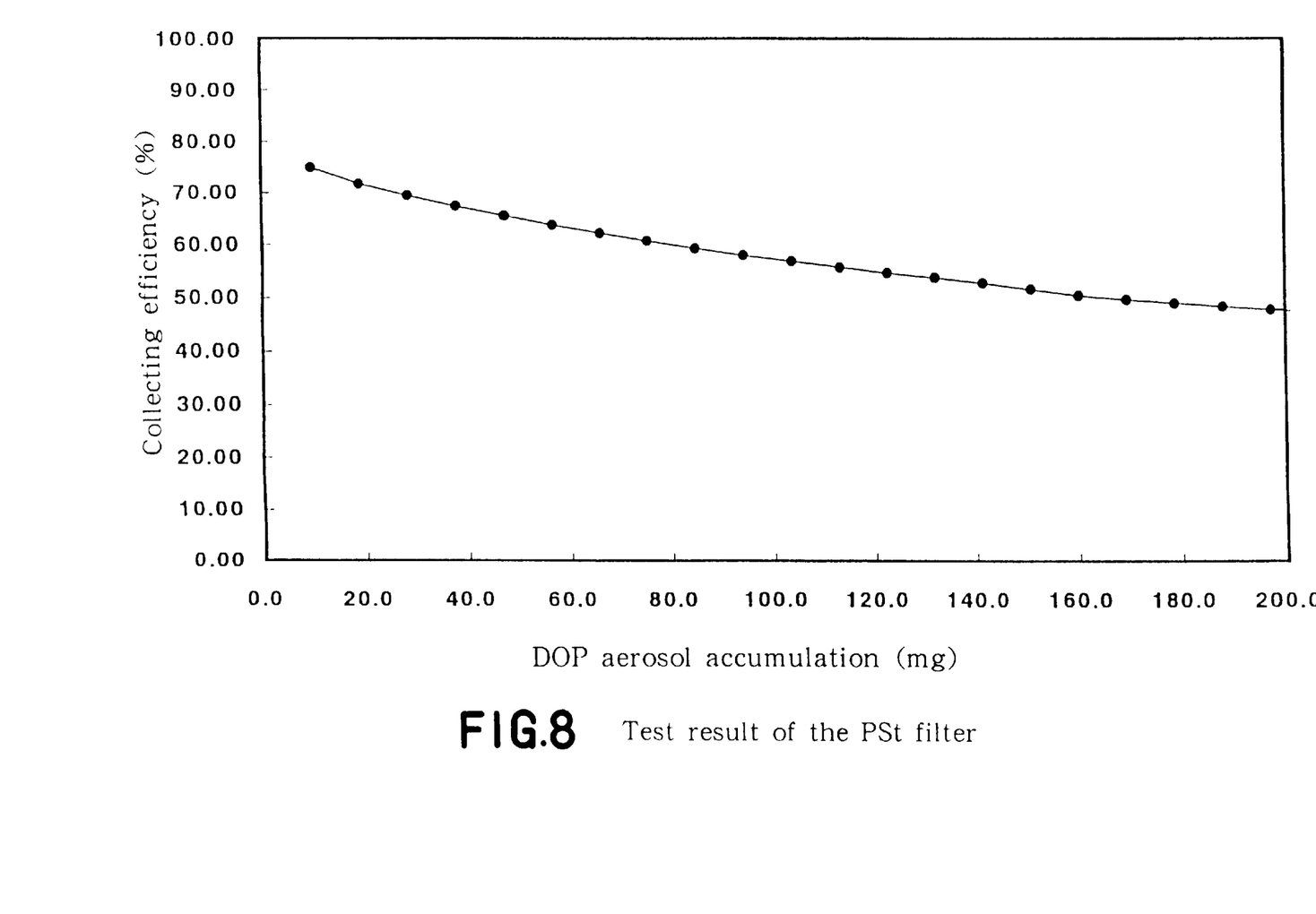
FIG. 8 graphically shows a test result obtained with respect to the PSt filter of the fourth comparative example.

8 g of the PSt resin as used in Embodiment 3 was dissolved in 1 liter of Trichlene to obtain a processing liquid H. The fibrous component was treated in the same manner as in Embodiment 1 with this processing liquid H instead of the processing liquid A to obtain an electrostatic filter (PSt filter). On this PSt filter, the same test as in Embodiment 1 was conducted and a result as shown by FIG. 8 was obtained.

The test results of Embodiments 1–4 clearly indicate that, in spite of the severe preconditioning, the electrostatic filters according to the invention maintain a collecting efficiency of 95% or higher even after 200 mg of the DOP aerosol has accumulated on the filters and well meet the revised NIOSH Standard. The test results of Comparative Examples 1–4 clearly indicate that the electrostatic filters having no combination of the MK resin and the PFA/STA resin do not meet the revised NIOSH Standard.

The test result of Embodiment 5 indicates that a particularly high collecting efficiency can be achieved when the fibrous comonent contains the polyester fiber of 30–80% by weight. The DOP collecting efficiency of the filter containing polyester fiber of 60% by weight is higher than that of the PFA/STA filter, No. 4, such a difference between the two filters seems to be brought by the reason that the former filter was not subjected to the preconditioning (See FIG. 4 and Table 1).

As have been shown in the above, it is clear that the electrostatic filter of the invention achieves a significant improvement in the collecting efficiency for DOP aerosol and/or dust with a negligible increase of the inspiratory resistance in comparison with the electrostatic filters of the prior art. One of the factors contributing to such an improvement might be the features of the PFA/STA resin having high oil repellency and high negative charge. Even after a plenty of the DOP aerosol has accumulated on the charged fiber and the charged resin of the filter of the invention, the PFA/STA resin prevents the DOP aerosol from forming film on the filter surface and from penetrating the charged fiber as well as the charged resin. With a consequence, the static charge stored in the filter is well protected and able to collect dust for a long period.

Figure 13:
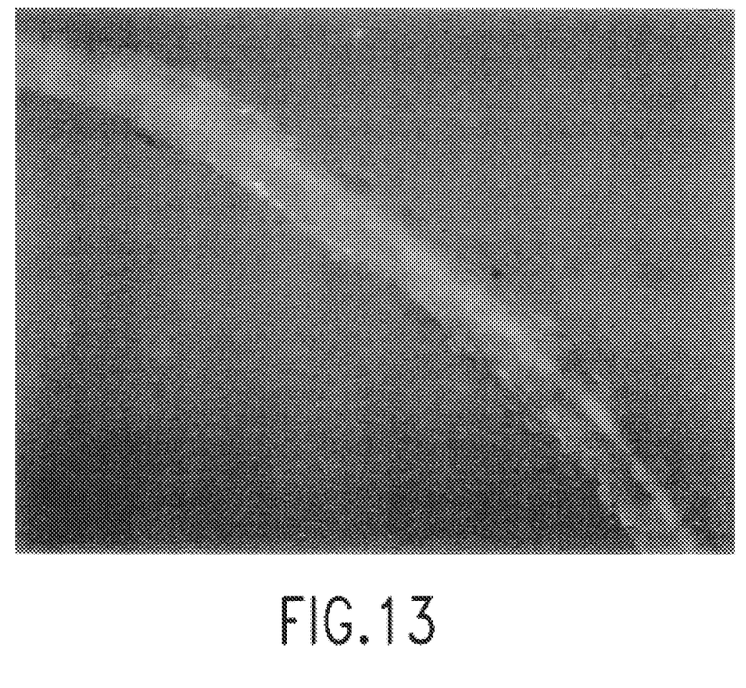
FIG. 13 is a microscopic photograph showing the PFA/STA filter, No. 4, of which the magnification is 400 times the original size, before the efficiency test.

FIG. 13 is a microscopic photograph of the PFA/STA filter, No. 4 (Embodiment 4), of which the magnification is 400 times the original size, before the DOP aerosol collecting efficiency test, showing the resin adhesively solidified on the wool fiber having a diameter of approximately 20 μm.

Figure 14:
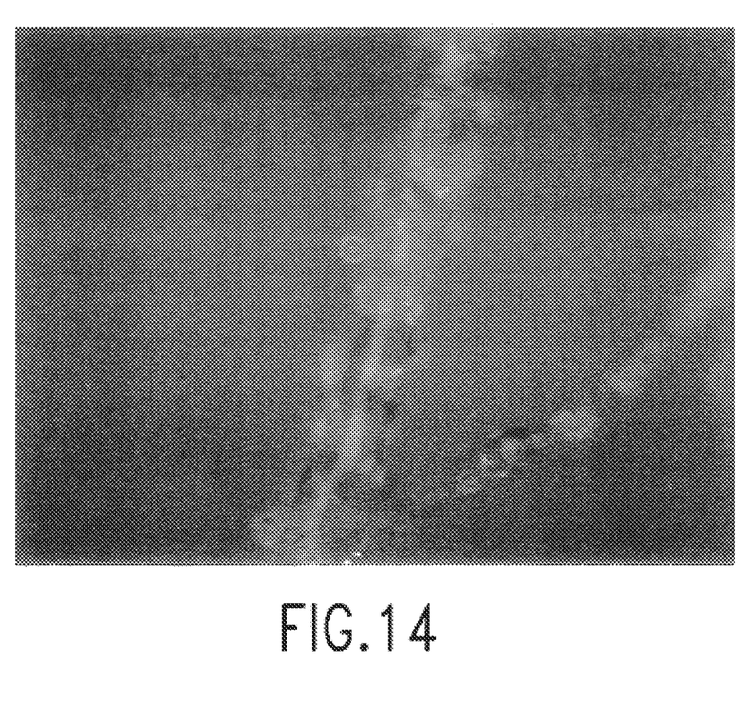
FIG. 14 is a photograph similar to FIG. 13 showing the PFA/STA filter, No. 4 after the efficiency test.

FIG. 14 is a microscopic photograph of the PFA/STA filter, No. 4, which has the same magnification as FIG. 13, after the DOP aerosol collecting efficiency test, showing DOP particles growing and accumulating on the surface of the wool fiber in a spherical shape. This photograph might suggest that the film formation by the DOP during its accumulation is effectively prohibited under the oil repellent nature of the PFA/STA resin.

Figure 15:
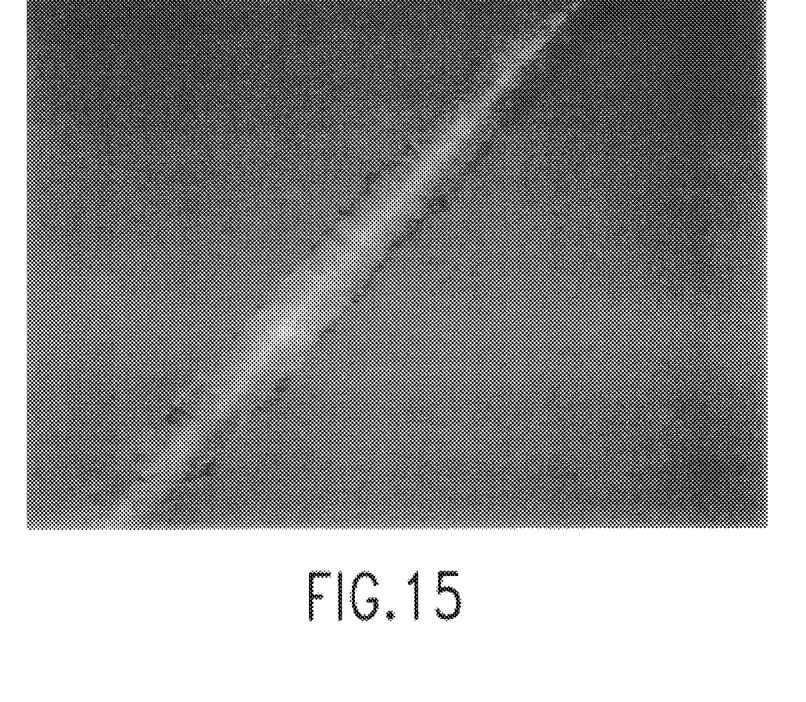
FIG. 15 is a microscopic photograph showing the MK filter at the same magnification as FIG. 13 before the efficiency test.

FIG. 15 is a microscopic photograph of the wool fiber in the MK filter (Comparative Example 1), which has the same magnification as FIG. 13, before the DOP aerosol collecting efficiency test.

Figure 16:
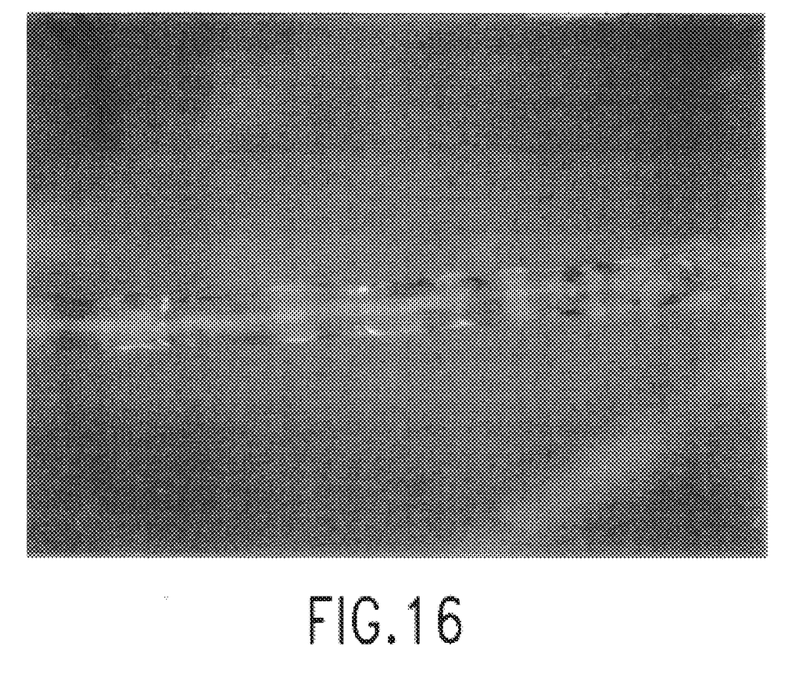
FIG. 16 is a photograph similar to FIG. 15 showing the MK filter after the efficiency test.

FIG. 16 is a microscopic photograph similar to FIG. 15 but showing the MK filter after the collecting efficiency test. Comparison of the microscopic photographs of the MK filters taken before and after the DOP test indicates that the fiber surface of the filter tends to be covered with DOP oil film after the test. The advantageous effect of the combination of the PFA/STA resin and the MK resin can be readily understood from the comparison of the photograph of the inventive filter taken after the test (FIG. 14) and the photograph of the filter of the prior art taken after the test (FIG. 15).

According to the test results of the inventive filter, the mixing ratio of the wool fiber and the thermoplastic synthetic fiber is one of the factors contributing to the improvement in the collecting efficiency of the filter. The mixing of the relatively thick wool fibers usually having a diameter of 15 to 33 μm and the relatively fine thermoplastic synthetic fibers having a fineness not exceeding 1.5 d is effective in obtaining both of the high mechanical collecting efficiency and the high electrostatic collecting efficiency of the filter. When the polyester fiber is used as the thermoplastic synthetic fiber, its mixing ratio relative to the wool fiber is preferably 80–30% by weight.

According to the test results of the inventive filter, another factor contributing to the improvement in the collecting efficiency of the filter lies in that the resins which can be easily charged by a mechanical treatment are used together with the perfluoroalkyl acrylate copolymer resin and in that the fibrous component such as a nonwoven fabric or a felt is impregnated with these resins evenly in the direction of the thickness thereof.

The inventive filter comprising a combination of these advantageous factors also differs from an electret filter, one of the electrostatic filters of the prior art, which is electrostatically charged by electric means such as corona discharge and contains a positive charge on one side and a negative charge of equal magnitude on the opposite side, in that the inventive filter is uniformly charged from the surface to the interior thereof and in that a high collecting efficiency can be maintained even after a plenty of DOP aerosol has accumulated thereon.

The PFA/STA filter No. 4 of Embodiment 4, which contains, in addition to the MK resin and the PFA/STA resin, the PMMA resin and the PSt resin, maintains a particularly high collecting efficiency even after the aerosol accumulation has increased. This advantageous feature of the inventive filter seems to be obtained, owing to that these various resins are finely crushed and delamination occurs along the interfaces between the fibers and the resins during the mechanical treatment. Particularly, in view of a fact that the PMMA resin is positively charged and the PSt resin is negatively charged, the quantity of static charges generated by the mechanical treatment in the filter of Embodiment 4 could be thought to be substantially higher than those in the filters of Embodiments 1–3.

Figure 9:
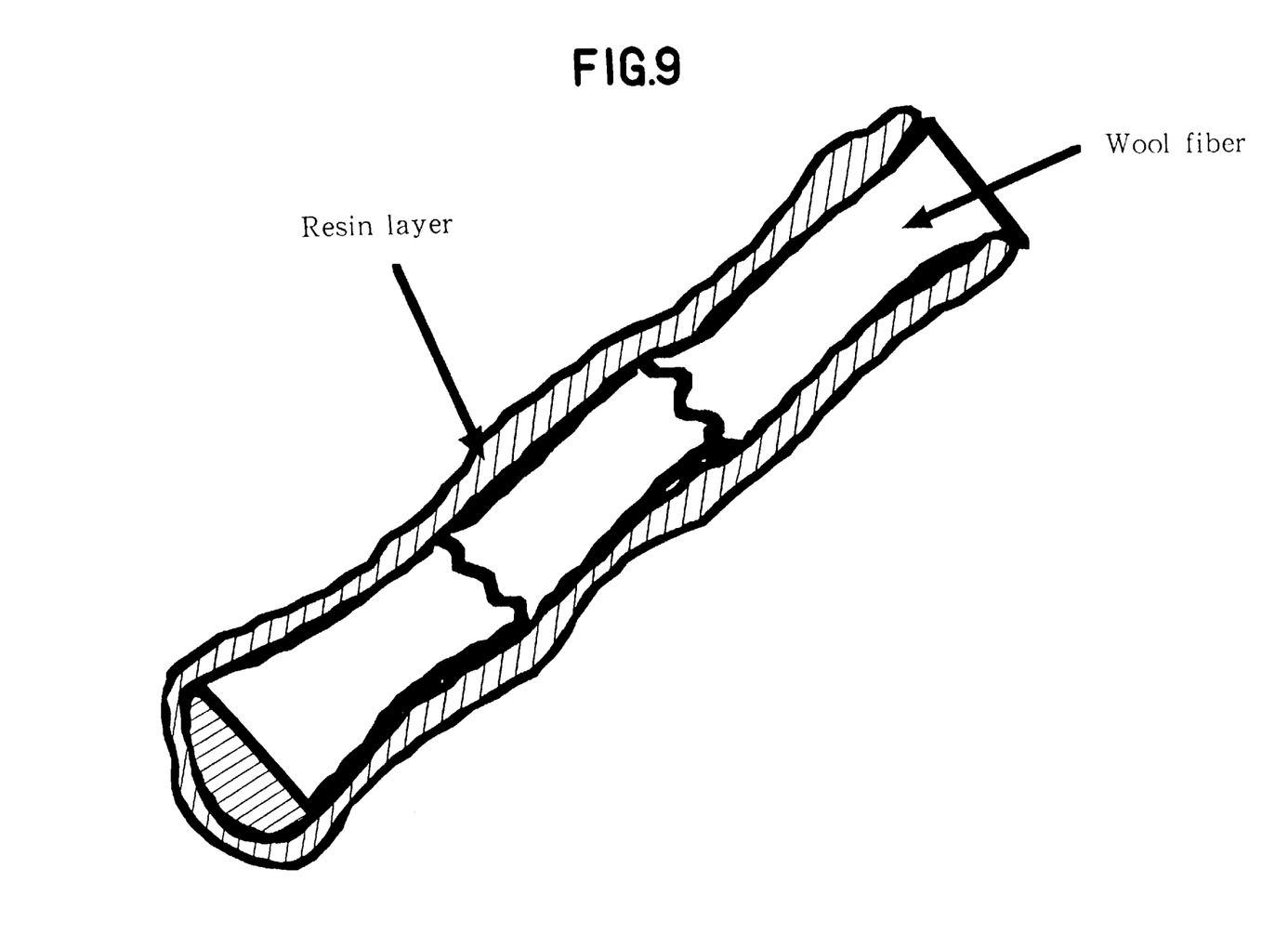
FIG. 9 is a schematic sectional view of a wool fiber impregnated with a resin which is solidified thereafter in the fourth embodiment of the present invention.
Figure 10:
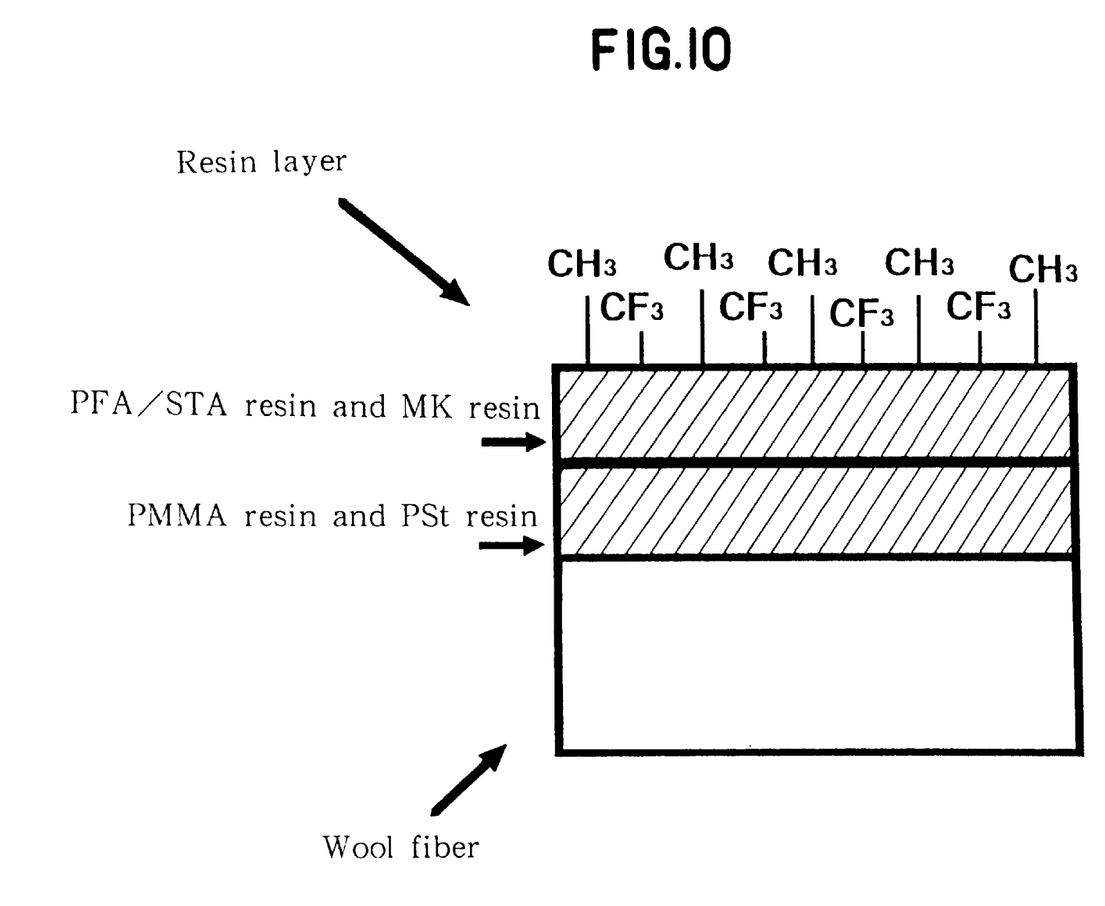
FIG. 10 is a fragmentary sectional view of the wool fiber in an enlarged scale.
Figure 11:
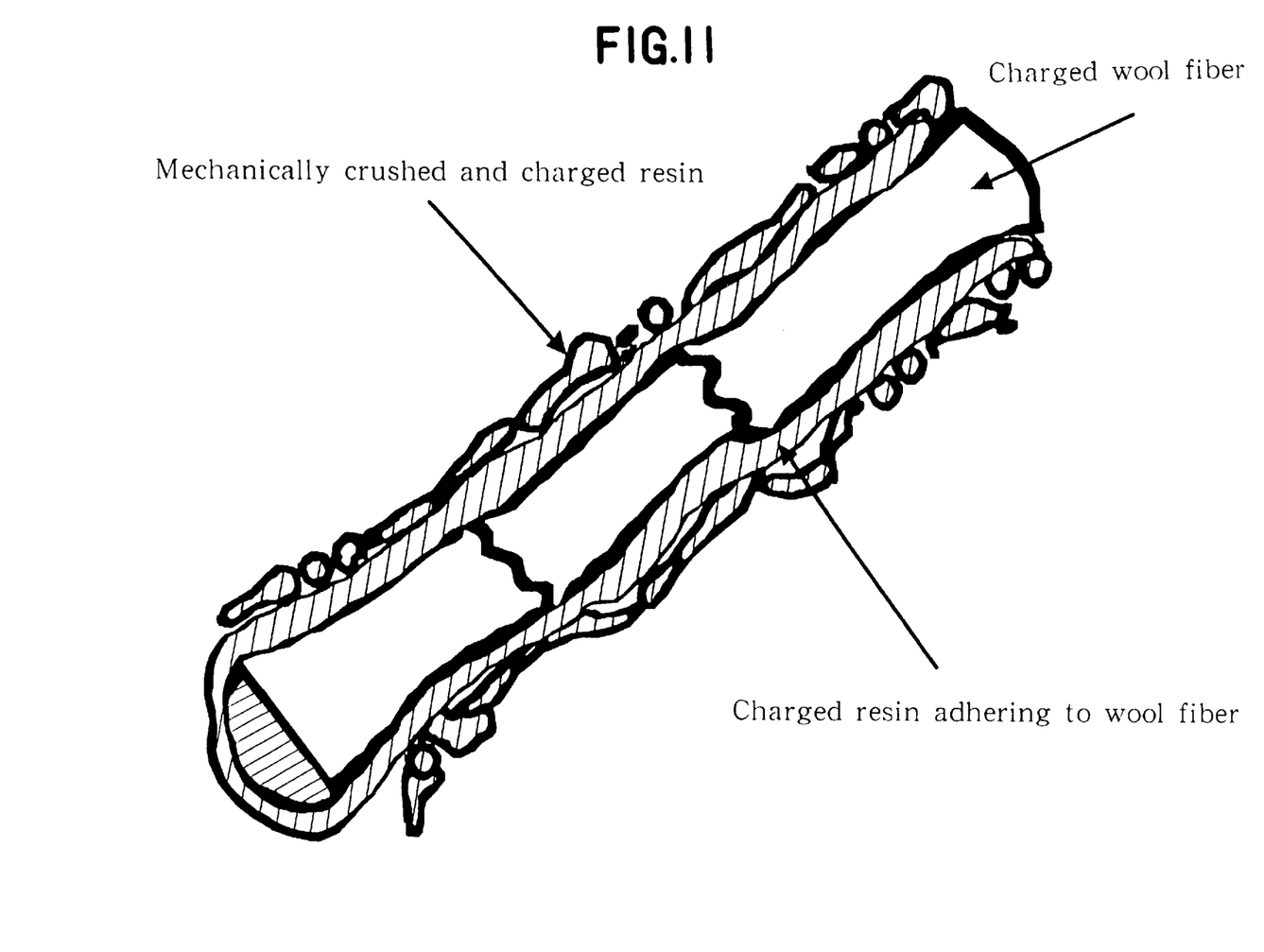
FIG. 11 is a schematic diagram illustrating the PFA/STA filter, No. 4 of the fourth embodiment subjected to a treatment of mechanical friction to charge the wool fiber and the resin adhering to the fiber.

FIGS. 9, 10 and 11 are respectively a sectional view of the wool fiber with the resinous component solidified thereon, a scale-enlarged fragmentary sectional view of such a wool fiber and a sectional view of the wool fiber after it has been subjected to the mechanical treatment in Embodiment 4. The structural features of the inventive filter will be understood from the comparisons among FIGS. 9, 10, 11 and 12. In this manner, the present invention provides an electrostatic filter for a respirator with a high collecting efficiency which meets the revised NIOSH Standard with maintaining "a low resistance", one of the most valuable features of a filter.

The present invention described herein above is also disclosed by Japanese Patent Application No. H8-357255 of which inventor is the same as the present invention. The disclosure of Japanese Patent Application No. H8-357255 is incorporated herein by reference.

What is claimed is:

1. An electrostatic filter comprising an electrostatically charged fibrous component including a mixture of an animal wool fiber and a thermoplastic synthetic fiber and an electrostatically charged resinous component adhering to the fibrous component and including a p-tert-butylphenol formaldehyde resin, wherein the resinous component includes further at least an electrostatically charged perfluoroalkyl acrylate copolymer resin.

2. An electrostatic filter according to claim 1, wherein the resinous component includes further at least any one of a polyalkyl acrylate resin, a polyalkyl methacrylate resin and a polyalkyl styrene resin, each of which resins is in an electrostatically charged condition.

3. An electrostatic filter according to claim 2, wherein the polyalkyl methacrylate resin is a polymethyl methacrylate resin.

4. An electrostatic filter according to claim 2, wherein the polyalkyl styrene resin is a polystyrene resin.

5. An electrostatic filter according claim 1, wherein the resinous component includes further a polymethyl methacrylate resin and a polystyrene resin, both of which resins are in electrostatically conditions.

6. An electrostatic filter according to claim 1, wherein the fibrous component has been impregnated with the resinous component which has been solidified thereafter.

7. An electrostatic filter according to claim 1, wherein the fibrous component includes the wool fiber having a diameter of 15 to 33 μm and the thermoplastic synthetic fiber having a fineness not exceeding 1.5 denier.

8. An electrostatic filter according to claim 1, wherein the fibrous component comprises a wool fiber of 20–70% by weight and a polyester fiber of 80–30% by weight.

9. An electrostatic filter according to claim 1, wherein the fibrous component has a weight range of 200–800 g/m$^2$.

10. An electrostatic filter according to claim 1, wherein the fibrous component is any one of a nonwoven fabric and a felt.

* * * * *